United States Patent [19]

Grimes et al.

[11] 4,334,179
[45] Jun. 8, 1982

[54] APPARATUS FOR DEMODULATING A PULSE EXCITED SYNCHRO POSITION SENSOR

[75] Inventors: Terrence L. Grimes, Phoenix; Harold L. Swartz, Glendale, both of Ariz.

[73] Assignee: Sperry Corporation, New York, N.Y.

[21] Appl. No.: 159,425

[22] Filed: Jun. 16, 1980

[51] Int. Cl.³ .............................................. G05B 1/06
[52] U.S. Cl. .................................... 318/661; 318/636; 329/50; 340/347 M; 340/347 SY; 340/870.21; 340/870.34
[58] Field of Search ................... 340/347 M, 347 SY; 318/661, 636; 328/151; 329/50

[56] References Cited

U.S. PATENT DOCUMENTS

| | | | |
|---|---|---|---|
| 3,505,669 | 4/1970 | Welch | 340/347 SY |
| 3,708,737 | 1/1973 | Johnson | 318/636 |
| 3,829,752 | 8/1974 | Martines et al. | 318/654 |
| 4,031,479 | 6/1977 | Thomas, Jr. et al. | 318/661 X |
| 4,270,077 | 5/1981 | Swartz et al. | 318/661 |

Primary Examiner—Thomas J. Sloyan
Attorney, Agent, or Firm—Howard P. Terry; Richard J. McGrath

[57] ABSTRACT

In a device having a synchro resolver and a microprocessor, the apparatus of the present invention utilizes a pulse excitation technique for converting a synchro output signal to a digital format. A pulsed waveform is selectively applied to the input windings of synchro resolver and output voltages are induced in the output windings. A sample and hold circuit is selectively enabled and selectively coupled to the output windings of the synchro resolver, and the sampled output signal of the output windings is converted into a digital format via an analog-to-digital converter.

5 Claims, 2 Drawing Figures

APPARATUS FOR DEMODULATING A PULSE EXCITED SYNCHRO POSITION SENSOR

BACKGROUND OF THE INVENTION

1. Field of the Invention

The invention relates generally to synchro devices and particularly to synchro resolver devices in a flight instrumentation situs where the output signals of a synchro resolver normally require demodulation.

2. Description of the Prior Art

Synchro devices such as synchro resolvers are utilized in numerous flight instrument applications, as well as in applications in many other fields, for providing a measure of angular position. For example, synchro resolvers are utilized to provide an angular position feedback signal in closed loop positioning servoes. In such an application, the resolver rotor may be coupled to the element being positioned by the servo and a sinusoidal voltage, typically having a frequency of 400 Hz, applied, for example, to the resolver rotor windings. The sinusoidal excitation voltage is coupled from the rotor windings to the stator output windings to provide sinusoidal output signals having respective amplitudes proportional to the sine and cosine of the angle at which the rotor is positioned. The output voltages are either in-phase or out-or-phase with the excitation voltage depending upon the angular position of the resolver rotor. It is well known in the art that the output voltages may be converted to d.c. signals of amplitude proportional to the respective sine and cosine values and of polarity in accordance with whether the output voltage is in-phase or out-of-phase with the excitation signal.

Conventionally, bulky, complex and expensive synchronous demodulators have been utilized to convert the sinusoidal synchro output voltages to corresponding d.c. levels. U.S. Pat. No. 4,270,077, issued May 26, 1981, assigned to the Applicants' assignee, however, discloses a demodulatorless synchro resolver angular position sensor which provides the sine and cosine of angular position by applying a continuous square wave excitation to the resolver rotor winding. The corresponding square wave outputs of the sine and cosine windings of the resolver stator are sampled in time synchronism with the excitation at a predetermined time phase of the square wave excitation cycle. The sampled sine and cosine amplitudes are converted into digital format via an analog-to-digital converter for application to a digital processor. The upper corners of the positively-going leading edges and the lower corners of the negatively-going leading edges of the continuous square wave excitation waveform are rounded to minimize ringing of the sine and cosine square wave outputs from the resolver.

The above described apparatus, utilizing continuous square wave excitation and time phase sampling thereof, may often be disposed in a flight instrument situs where reduced size, cost, and power dissipation are highly desirable objectives. The amount of circuitry, necessary to effect the continuous square wave excitation technique associated with the above described apparatus, however, is not always consistent with these desired objectives. Therefore, there is a need for a simpler and less expensive apparatus for converting resolver sine and cosine output voltages into a digital format.

SUMMARY OF THE INVENTION

According to the present invention, a simpler and less expensive apparatus utilizing a pulse excitation technique for converting resolver output winding voltages into a digital format is provided. A d.c. voltage source is coupled to the input winding or rotor of the synchro resolver, and selectively enabled switching means, which preferably includes a transistor driver, couples and decouples the voltage source thereby applying a pulsed waveform to the input winding. The pulsed waveform induces output voltages in the stator or sine and cosine output windings of the synchro resolver. The sine and cosine windings are selectively coupled to a selectively enabled sample and hold circuit. The output signal of the sample and hold circuit is converted into a digital format via an analog-to-digital converter such that it corresponds to the sine and cosine output winding voltages as taught in the referenced U.S. Pat. No. 4,270,077. Moreover, a microprocessor may control the entire sequence of selectively enabling the switching means and the sample and hold circuit, as well as the coupling of the sine and cosine windings to the sample and hold circuit.

DESCRIPTION OF THE PREFERRED EMBODIMENT

Figure 1:
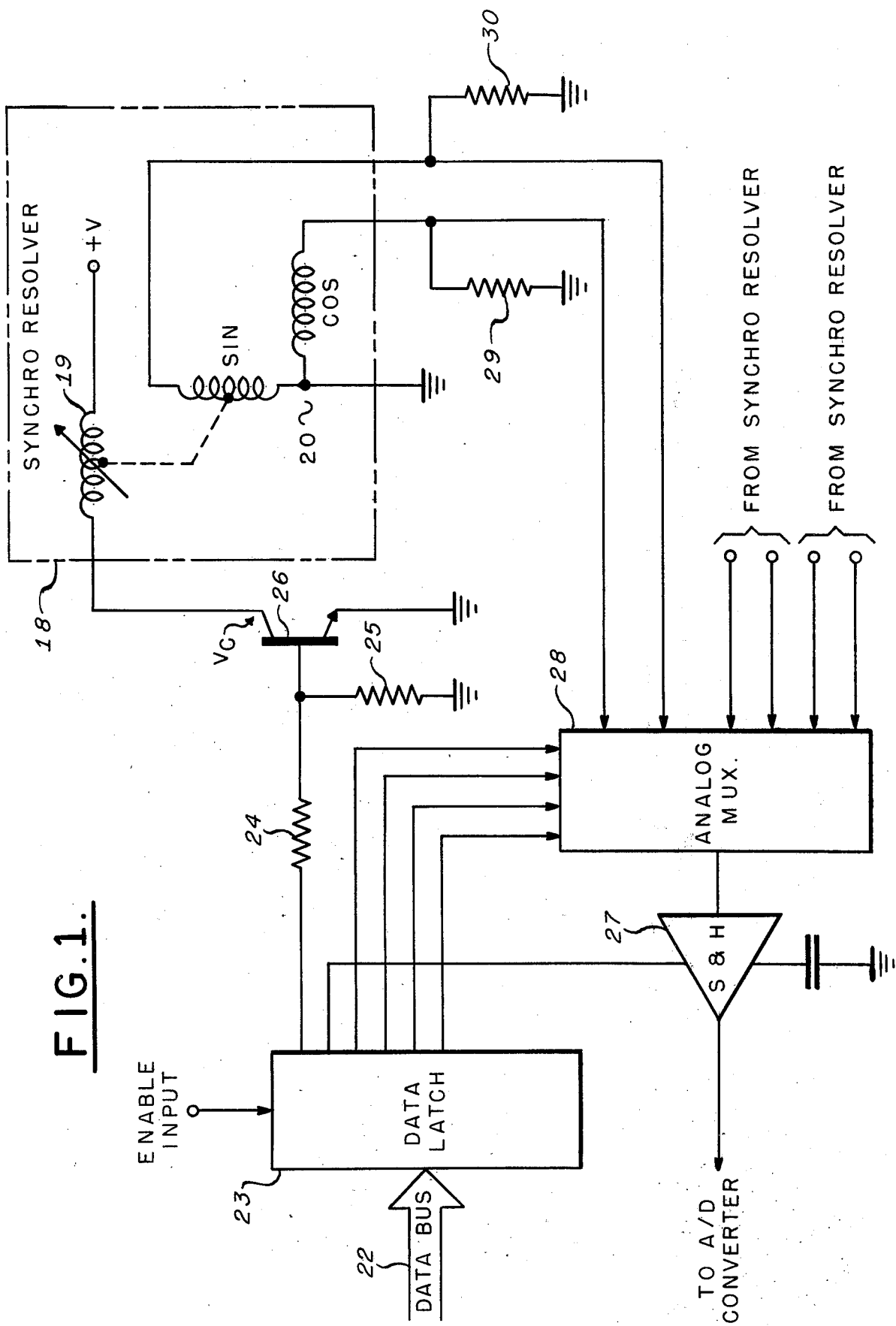
FIG. 1 is a schematic block diagram of the present invention.

Referring to FIG. 1, a schematic block diagram illustrates the present invention, and it can be appreciated that the present invention may be incorporated into many different devices utilizing a synchro resolver. Typically, a digital HSI flight instrument is a device which may utilize a plurality of synchro resolvers and a microprocessor, and it is an ideal situs for the present invention. Accordingly, the description of the preferred embodiment will be made in the context of an HSI instrument, but it should be understood that the preferred embodiment is in no way limited to HSI instruments or indeed to instruments in general but may find application in many servo systems and the like. The HSI instrument of the type described in the referenced U.S. Pat. No. 4,270,077, issued May 26, 1981, assigned to the Applicants' assignee, ordinarily includes a plurality of positioning servoes. One of the servoes, for example the servo positioning the instrument compass card, may include a servo amplifier for driving a servo motor which, in turn, positions the compass card via suitable mechanical coupling. A synchro resolver is coupled to the output shaft of the servo motor to provide angular positional feedback data for the servo, the feedback data representing the angular position of the compass card.

In FIG. 1, a first synchro resolver 18, which may be utilized for providing feedback data representative of the angular position of the compass card, is comprised of a rotor winding 19 and stator windings 20, the rotor winding being mechanically coupled to the output shaft of the servo motor (not shown) through suitable gearing. The two output windings of the stator 20 provide signals proportional to the sine and cosine, respectively, of the rotor angle in a manner to be described in accordance with the present invention. A pulsed excitation voltage $V_c$ is applied to the rotor winding 19 in accordance with the invention so as to enable the apparatus of the invention to derive the sine and cosine data from the output windings of the stator 20 without utilizing demodulators in a manner to be explained.

The HSI instrument situs in which the present invention is incorporated includes a digital microprocessor (not shown) that provides digital data words to the instrument wherein they are converted into analog format for use therein. Analog signals within the instrument are converted into digital format for application to the microprocessor wherein data processing functions are performed thereon. Digital data is transferred to and from the processor, as well as to the apparatus of the present invention via a data bus 22. The apparatus of the present invention includes a data latch 23 for temporary data storage of digital words from the data bus 22. The data latch 23 which is preferably comprised of D-type flip flops includes an enable input line and a plurality of output lines. A first output line of the data latch 23 is coupled to switching means 26 via a resistor 24 and a grounded resistor 25. The switching means 26 preferably is comprised of a transistor 26 having its base coupled to an output line of the data latch 23, its emitter coupled to ground, and its collector coupled to the input winding 19 of the synchro resolver 18. The input winding 19 is coupled to a voltage source +V. The serial coupling of the switching means 26, the input winding 19, and the voltage source as described herein is merely illustrative, and it should be appreciated that any circuit design which provides for the switching of a pulsed potential across the input winding 19 is suitable for use with the apparatus of the present invention. A second output line of the data latch 23 is coupled to the enable input of a sampling means 27 which preferably be comprised of a commercially available sample and hold integrated circuit. The remaining output lines of the data latch 23 are utilized as address and enable input lines to an analog multiplexer 28 which preferably may also be a commercially procurable integrated circuit.

The data transmitted on the address and enable input lines to the analog multiplexer 28 selectively couples the output winding 20 of the first synchro resolver 18 to the output of the analog multiplexer 28. It should be noted that other synchro resolvers may be coupled to the apparatus of the present invention, but for the purposes of simplicity the apparatus of the present invention will be described in the context of a single synchro resolver. Since the sine and cosine windings 20 of the synchro resolver 18 are individually coupled to the analog multiplexer 28, each winding may be read individually. The output signal of the analog multiplexer 28 is applied to the sampling means 27 which, in turn, applies its output signal to an analog-to-digital converter (not shown) which preferably may be of a commercially procurable type.

Figure 2:
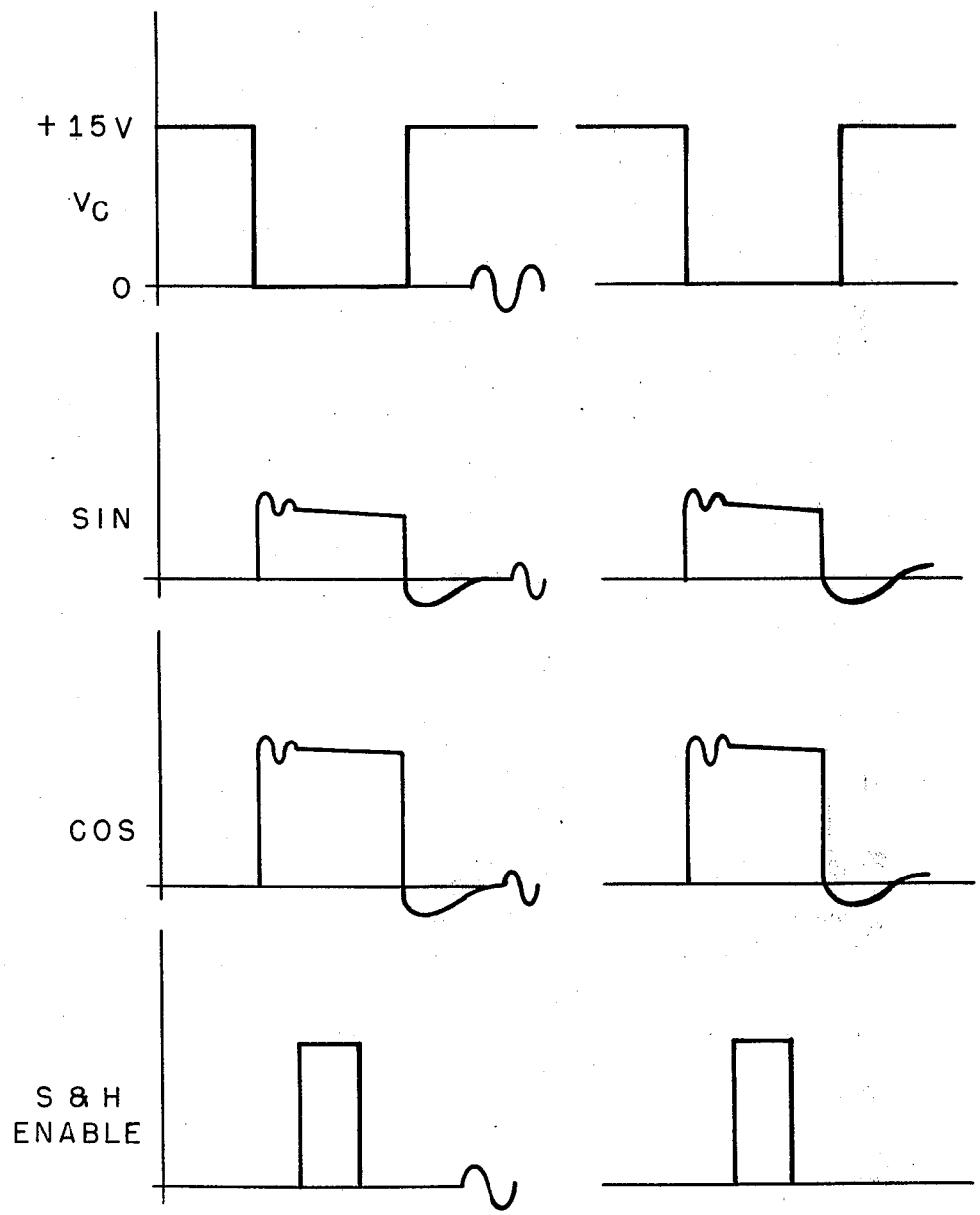
FIG. 2 is a waveform timing diagram illustrating waveforms at various points of FIG. 1.

In operation and as illustrated in the timing waveforms of FIG. 2, the software of the microprocessor (not shown) controls the excitation of the synchro resolver 18 and the selective sampling of the output voltages induced in the sine and cosine output windings 20, such that the output signal from the sampling means 27 may be converted into a digital format via the analog-to-digital converter. The microprocessor latches commands in the form of digital words onto the data latch 23. These digital words contain bits of data which are supplied to the switching means 26, the sampling means 27, and the analog multiplexer 28. In order to read the output of either the sine or the cosine winding 20, the correct multiplexer address for either winding 20 is latched and supplied to the multiplexer 28 which results in the selected winding 20 of the synchro resolver 18 being coupled to the sample and hold circuit 27. The microprocessor then commands switching means or excitation transistor 26 "on" by latching a "1" on to the data latch output line coupled to the switching means or transistor 26. Since the input winding 19 is coupled to a positive voltage source and since the emitter of the transistor 26 is coupled to ground, the switching of the transistor 26 on and off produces a pulsed excitation waveform $V_c$ (FIG. 2) across the switching means 26. The inverse of waveform $V_c$ thus appears across input winding 19, i.e., when $V_c$ is low +15 volts d.c. appears across input winding 19. Preferably, an excitation pulse is applied to the input winding 19 for a time period of approximately 100 microseconds. During this time period, the microprocessor enables the sample and hold for approximately 50 microseconds as illustrated in FIG. 2, and the sample and hold circuit samples the selected sine or cosine winding 20 coupled through the multiplexer 28. After the magnetic field of the resolver 18 has decayed to zero, which takes on the order of 5 milliseconds, the circuit may then be reexcited, and the output of the other output winding 20 may be read in a similar fashion. It can be appreciated, therefore, that the output signal of the sample and hold circuit 27 is suitable for conversion into a digital format via an analog-to-digital converter as taught in the referenced copending application.

It should be noted that there is initially a small amount of ringing in the waveforms induced in the sine and cosine windings 20 as illustrated in FIG. 2. The loading applied to sine and cosine windings 20 by resistors 29 and 30, however, damps this ringing, thereby minimizing its effect. Moreover, the sine and cosine waveforms are not flat, but gently slope towards zero volts as a result of the inductance and the resistance of the resolver 18. Consequently, the sample end time as measured from the start of an excitation pulse should be exactly the same for each successive measurement. Furthermore, since the software of the microprocessor controls the start of an excitation pulse, there is no requirement for the microprocessor to wait for the proper phase of excitation to occur as taught in the referenced prior art. The circuit, therefore, may remain quiescent a larger percentage of time, and power requirements are substantially reduced.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus, for use with a synchro device which has excitation input winding means and at least first and second output winding means, and for providing demodulated synchro output signals, comprising:
   means for applying a potential to said excitation input winding means;
   switching means operatively coupled to said excitation input winding means for intermittently applying at any appropriate point in time said potential across said excitation input winding means such that at least successive first and second pulse waveforms are induced in said first and second output winding means;

sampling means selectively enabled and coupled to said first and second output winding means for sampling said successive first and second pulsed waveforms; and means for enabling said switching means and for uniformly enabling said sampling means with respect to said switching means, such that the output signal of said sampling means provides the demodulated synchro output signals.

2. The apparatus of claim 1 in which said sampling means comprises a sample and hold circuit.

3. An apparatus according to claim 2 wherein said switching means includes a transistor having its collector coupled to said input winding means and its emitter coupled to ground.

4. The apparatus of claim 3 further including analog-to-digital conversion means responsive to said sampling means for converting said demodulated synchro output signal into an equivalent digital word.

5. An apparatus according to claim 4 wherein the output terminals of said first and second output winding means are coupled to resistance means.

* * * * *